United States Patent
Yagur (10) Patent No.: US 9,734,593 B2
(45) Date of Patent: Aug. 15, 2017

(54) OBJECT LOCATING AND TRACKING IN VIDEO FRAMES USING SMOOTHNESS CHECK ALONG SPECIFIED LINE SECTIONS

(75) Inventor: Shay Yagur, Tel-Aviv (IL)

(73) Assignee: TIMOCCO LTD., Tel-Aviv (IL)

( * ) Notice: Subject to any disclaimer, the term of this patent is extended or adjusted under 35 U.S.C. 154(b) by 0 days.

(21) Appl. No.: 13/636,693

(22) PCT Filed: Mar. 20, 2011

(86) PCT No.: PCT/IL2011/051156
§ 371 (c)(1),
(2), (4) Date: Sep. 23, 2012

(87) PCT Pub. No.: WO2011/117793
PCT Pub. Date: Sep. 29, 2011

(65) Prior Publication Data
US 2013/0088606 A1     Apr. 11, 2013

(30) Foreign Application Priority Data
Mar. 22, 2010   (GB) ................................. 1004689.4

(51) Int. Cl.
| G06T 7/73 | (2017.01) |
| G06K 9/46 | (2006.01) |
| G06K 9/32 | (2006.01) |

(52) U.S. Cl.
CPC ............ *G06T 7/74* (2017.01); *G06K 9/4642* (2013.01); *G06K 2009/3291* (2013.01)

(58) Field of Classification Search
CPC .................................................. G06T 7/0044
(Continued)

(56) References Cited

U.S. PATENT DOCUMENTS 5,764,770 A * 6/1998 Schipper ................ G01S 19/14
                                                   380/200
6,434,254 B1 * 8/2002 Wixson ............. G06K 9/00785
                                                   348/122
2005/0026689 A1 2/2005 Marks

FOREIGN PATENT DOCUMENTS
WO     0141884 A1    6/2001

OTHER PUBLICATIONS

Bonarini et al., "IEEE Transactions on Instrumentation an Mesurment", 2000, IEEE, Piscataway NJ, vol. 49, No. 3, "An Omnidirectional Vision Sensor for Fast Tracking for Mobile Robots".

(Continued)

*Primary Examiner* — Antoinette Spinks
(74) *Attorney, Agent, or Firm* — Roach Brown McCarthy & Gruber P.C; Kevin D. McCarthy (57) ABSTRACT

A method of defining a location of a given object in an image of interest, where the object is characterized by having a specified pattern and an additional property. In an exemplary embodiment the method includes: specifying portions of the image, identifying among the specified image portions a candidate image portion comprising a portion of the specified pattern; defining an image region around the candidate image portion, the image region being composed of image portions, each comprising a portion of the specified pattern, the image region being surrounded by image portions not comprising a portion of the specified pattern; comparing the other property of the given object with same property at the identified region, and if the image region has the additional property of the given object, identifying the location of the given object as the location of the defined image region.

17 Claims, 6 Drawing Sheets

(58) Field of Classification Search
USPC .................................................. 348/207.1
See application file for complete search history.

(56) References Cited

OTHER PUBLICATIONS

Heinemann P., 2007, "Cooperative Multi-Robot Soccer in Highly Dynamic Environment" (Dissertation), Ch. 5.2 Image Processing Algorithms, pp. 49-68.
Hundelshausen & Rojas, "RoboCup 2003, Springer Lecture Notes in Artificial Intelligence". 2004, Springer-Verlag Berlin Heidelberg, vol. 3020, pp. 250-261, "Tracking Regions".
Jamzad et al., "Lecture Notes in Artificial Intelligence: Robocup-2001: Robot Soccer World Cup V", 2002, Springer-Verlag London, vol. 2377, pp. 71-80, "A fast vision system for middle size robots in robocup".
Jamzad et al., 2002, "Object detection in changing environment of middle size robocup and some applications", Proceedings of the 2002 IEEE International Symposium on Inteligent Control, pp. 807-810.
Jamzad et al., 2003, "Towards an intelligent vision system for mobile robots in robocup environment", Proceedings of the 2003 IEEE International Symposium on Inteligent Control, pp. 1012-1017.
Neves et al. "Progress in Artificial Intelligence; Lecture Notes in Computer Science", 2007, Springer-Verlag Berlin Heidelberg, pp. 499-507, "An Omnidirectional Vision System for Soccer Robots".
International search report from a foreign patent office (EPO) in a counterpart foreign application, Sep. 2, 2011.
Office action from a foreign patent office (UK) in a counterpart foreign application, Apr. 24, 2013.

\* cited by examiner

OBJECT LOCATING AND TRACKING IN VIDEO FRAMES USING SMOOTHNESS CHECK ALONG SPECIFIED LINE SECTIONS

CROSS-REFERENCE TO RELATED APPLICATIONS

This application is a U.S. National Phase Application under 35 U.S.C. 371 of PCT International Application No. PCT/IB2011/051156, which has an international filing date of Mar. 20, 2011, and which claims the benefit of priority of U.S. Provisional Patent Application No. 61/323,925, filed on Apr. 14, 2010, and GB Patent Application No. 1004689.4, filed Mar. 22, 2010, which are incorporated herein by reference in their entirety.

BACKGROUND

1. Technical Field

The present invention relates to image processing. More particularly, but not exclusively, some embodiments relate to locating objects in an image, and/or tracking objects in video streams.

2. Discussion of the Related Art

Tracking physical objects using video data processing is known in the art. For example, WIPO Patent Publication Number WO0141884 teaches a video processor configured for ball tracking in a game of cricket. For each video frame (image), a cricket ball is identified by pixel analysis based upon prior knowledge regarding the shape and size of the cricket ball. The analysis uses image processing techniques that are said in the aforementioned Patent Publication to be "so well known to those skilled in the art that detailed description herein is believed to be unnecessary".

US Patent Publication No. US2005026689 teaches a system and a method for object tracking. A hand-manipulated prop is picked-up through a single video camera. Each video frame (image) is then analyzed to isolate the part of the image pertaining to the object for mapping the position and orientation of the object into a three-dimensional space. The three-dimensional description of the object is stored in memory and used for controlling action in a game program, such as rendering of a corresponding virtual object in a scene of a video display. Algorithms for deriving the three-dimensional descriptions for various props employ geometry processing, including area statistics, edge detection and/or color transition localization, to find the position and orientation of the prop from two-dimensional pixel data. Criteria are proposed for the selection of colors of stripes on the props which maximize separation in the two-dimensional chrominance color space, so that instead of detecting absolute colors, significant color transitions are detected. Thus, the need for calibration of the system dependent on lighting conditions which tend to affect apparent colors can be avoided.

BRIEF SUMMARY

An aspect of some embodiments of the present invention concerns a method of defining a location of a given object, optionally a physical object, in an image of interest. The image of interest comprises pixels, and the object is characterized by having a specified pattern and an additional property In an exemplary embodiment, there is provided a method comprising: specifying portions of the image; identifying among the specified image portions a candidate image portion comprising a portion of the specified pattern; defining an image region around the candidate image portion, the image region being composed of image portions, each comprising a portion of the specified pattern, the image region being surrounded by image portions not comprising a portion of the specified pattern; comparing the other property of the given object with same property at the identified region, and identifying, if the image region has the additional property of the given object, the location of the given object as the location of the defined image region. Optionally, the method also comprises capturing the image of a physical object.

In an exemplary embodiment, the specified pattern is a smooth pattern, wherein the brightness and/or the color of each two adjacent pixels differ in less than a specified threshold. Exemplary thresholds are 5%, 10%, and 15%.

In some embodiments, the given object has a contour with a given shape, and the above-mentioned additional property is the shape of the contour. Another example of an additional property is the color of the object.

In some embodiment, the given object has a second additional property, and the location of the given object in the image is defined as the location of the defined image region only if the defined image region has this second additional property.

In some exemplary embodiments of the invention, the above-mentioned specifying of image portions comprises specifying linear image portions, each having a width of 1 pixel. Optionally, the image portions form a grid.

In an exemplary embodiment, the image of interest is a frame in a video stream. Optionally, the location of the given object in a preceding frame in the video stream is unknown.

Alternatively, the location of the given object in a preceding frame in the video stream is known. Optionally, the method comprises starting a search for the first candidate image portion in the vicinity of the known location of the object in the preceding frame.

An aspect of some embodiments of the invention relates to a method of tracking a given object in a video stream, the object moving from a first location in a first frame to a second location in a second frame, taken immediately after the first frame. In an exemplary embodiment, the object is characterized by having a specified pattern and an additional property, and the method comprises: searching in the second frame a first candidate image portion comprising a portion of the specified pattern; defining a region, in the second frame, composed of candidate image portions surrounding the first candidate image portion and surrounded by non-candidate image portions; and defining the location of the given object in the second frame as the location of the defined image region only if the image region has the additional property of the given object, wherein if the first location is known the search for the first candidate starts at a location in the second frame, which corresponds to the first location.

An aspect of some embodiments of the invention concerns a system comprising: an imaging device, for capturing an image of an object characterized by a pattern and at least one additional property; a computer storage, storing the pattern and the at least one additional property of the object carried by the object and at least one additional property characterizing the object and a processor, wherein the processor receives the pattern and the additional property stored on the computer storage, wherein the processor receives the image of the object taken by the imaging device, and wherein the processor identifies the location of the object in the image using a method described above. Optionally, the system further comprising the object which carries the pattern and is characterized by the at least one additional property.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
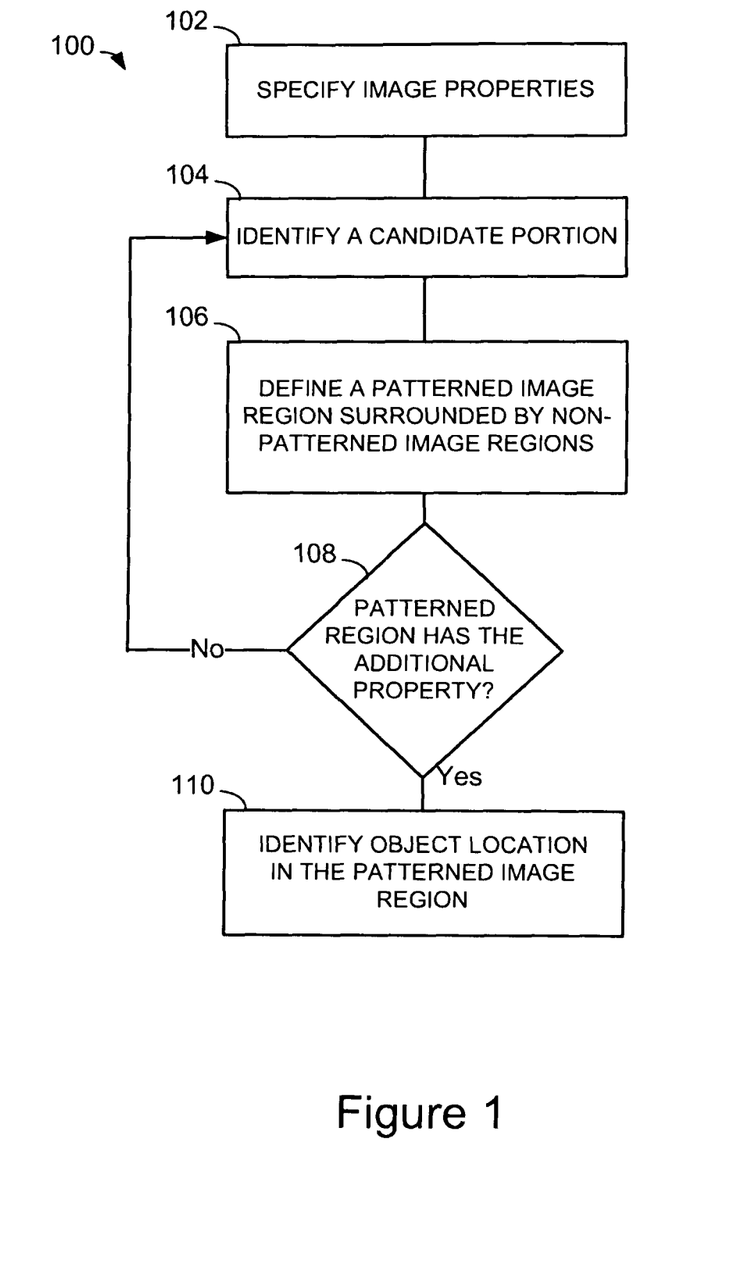
FIG. 1 is a high level flowchart showing actions to be taken in a method of locating an object in accordance with some embodiments of the present invention.

FIG. 1 is a high level flowchart illustrating an accelerated analysis of images by creation of a particular kind of a construct, which is simpler than the analyzed image, but contains sufficient amount of information for performing the required analysis. The simpler construct is referred to herein as a pattern parameter map of the image. A pattern parameter map comprises information on the existence (or non-existence) of a specified pattern in each of a plurality of portions of the image. In other words, embodiments of the present invention provide a pattern parameter map such as a grid map, wherein the analysis used for tracking objects is performed only over the aforementioned grid. Since the grid map contains only a fraction of the pixels of the image, the complexity of the proposed analysis is significantly reduced. Along the lines of the grid, the pattern of the pixels along each section of the grid lines is assessed, wherein prior knowledge about the pattern of the object-to-be-tracked enabled the analysis of the pattern map (e.g. grid).

In some embodiments, at first an image of the physical object-to-be-tracked is obtained. Optionally, obtaining the image comprises capturing the image with an imaging device. Alternatively or additionally, obtaining the image comprises receiving an image captured by an imaging device independently of the method.

In an exemplary embodiment, the specified pattern is the lack of any pattern, namely, smoothness. In one such embodiment, the pattern is identified to exist in an image portion when the difference in color and/or brightness between each two adjacent pixels in the portion is smaller than a specified threshold.

A pattern parameter map does not necessarily map the existence of the pattern in the entire image. Optionally, the map comprises information regarding certain regions of the image, and lacks information regarding other regions.

In some embodiments, certain image portions are predefined, and the map does not include information regarding any other portion of the image. Optionally, the predefined portions are spaced to define a grid on the image. In some embodiments, the grid includes 5-10% of the image pixels or less.

In some illustrative embodiments, the image portions are linear sections, having a width of 1 pixel, which are arranged to provide a grid.

Optionally, the location of a difference between the images is identified as the vicinity of the positions having different edge values in the two images.

An aspect of some embodiments of the invention concerns locating a given object in an image. The method allows replacing a complex shape-recognition algorithm that may be required for recognizing the object's shape within the image, with a simpler and quicker algorithm.

In an illustrative embodiment, the given object has a known pattern and contour, for example, a smooth sphere.

A first group of image portions is defined, to be checked for smoothness. Optionally, these image portions define a grid, which includes 75% or less of the image pixels.

The image portions of the first group are searched for the specified pattern. For example, the object is known to be smooth, and smooth portions are searched for. An image portion having the specified pattern is identified as a portion that possibly makes part of the given object, and referred herein as a candidate portion, or simply a candidate.

Optionally, when a certain candidate is identified, a contour of candidate portions surrounding the certain candidate and surrounded by non-candidate portions is defined.

In some embodiments, once a first candidate is defined, a second group of image portions is defined. The portions of the second group are all in the vicinity of the first candidate, and optionally include portions that are not members of the first group of image portions, searched to find the first candidate. This second group of image portions is sometimes referred to herein as an ad-hoc group.

Then, the defined contour is compared to a known contour of the object, and if they are the same, the object is identified to be in the image, at the location of the identified contour.

Optionally, candidates are checked for an additional given property of the object (for example, its color) to filter out candidates that have the specified pattern and first property, but not the additional property of the object. For example, smooth spheres having a wrong color are filtered out. This filtering out optionally takes place before the contour is defined. Alternatively or additionally, filtering takes place after a contour is defined, to amend the defined contour in accordance with the color. Optionally, filtering is carried out based on more than one additional property.

An aspect of some embodiments of the invention concerns tracking an object in a video stream. In exemplary embodiments, the video stream comprises images (also referred to as frames) taken at a rate of 25 images per second, optionally for many minutes.

In some embodiments, tracking means identifying in each frame at least one of the existence of the object in the image, the position of the object in the image, the distance of the object from the camera, the position of the object in respect of the camera, and the orientation of the object in respect of the camera.

Optionally, the tracking is performed online, such that the location, distance, and/or orientation of the object are determined in each frame in only a portion of the time between taking frames.

In an exemplary tracking embodiment the object is located in accordance with an above-described embodiment in the beginning of the tracking process and each time a refresh is needed, that is, each time the tracks of the given object are lost. Between refresh events, tracking is optionally carried out by a state of the art tracking method. In some embodiments, tracking between refresh events involves locating the image as described above, but the search for the first candidate begins at a location determined in accordance with the location of the object in the preceding frame.

Exemplary Pattern Maps

Figure 3:
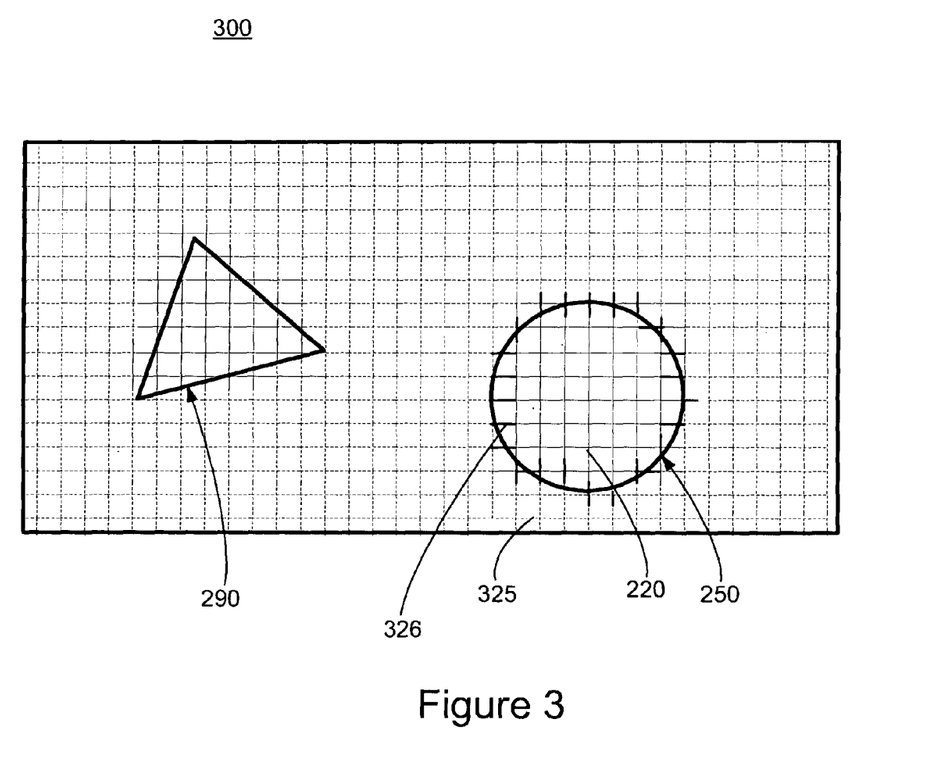
FIG. 3 is a schematic illustration of an image sliced by a grid and showing smooth object on a non-smooth background in accordance with some embodiments of the present invention.

FIG. 3 illustrates a pattern parameter map of an image. The map shown in a non-limiting example of a grid indicating existence (or non-existence) of the specified pattern. A smooth non-stationary ball 250 and a smooth stationary triangle 290 are shown over a non-smooth background. In the illustrated case, the specified pattern is smoothness, but this may be applied to any specified pattern. Thus the grid 300 shows in each of a plurality of portions of the image, overlapping with the grid lines where the smooth portions of the image are. Specifically, along the grid lines, continuous line sections (such as 220) represent smooth image portions, broken line (such as 325) sections represent non-smooth image portions, and continuous bold line sections (such as 326) represent image portions that have become smooth on the current image. Outside the grid, the smoothness is not determined.

Locating and tracking ball 25 or triangle 290 may be achieved by locating and tracking the continuous line sections of the grid representing the smooth object (or, in other embodiments, the object with the specified pattern thereon). In some embodiments, it may be advantageous to track the grid line sections that have become smooth on the current image, being non-smooth on the previous one (such as 326) as they indicate movements—for example that of ball 250. This may indicate the contour line of a smooth (specified pattern) object.

In the illustrated case there was no need to determined smoothness in most of the area of the image (hereinafter, the ignored area) because it was estimated that the ball cannot be found in the ignored area (due to its size, as it is much larger than the grid). This estimation was based on knowledge of the location of the object a short while before the present image was taken and some given velocity constrains on the movement of the ball. More specifically, the image is a frame from a video stream, and the ball was located in a preceding frame, taken about 40 milliseconds before the present frame was taken. The ignored area was determined using the assumption that the velocity of the ball is no more than 2.5 m/s.

In some embodiments, when the ball is not found in the image, the ignored area is made smaller and the object is searched for in further parts of the image.

Exemplary Method of Locating a Given Object in an Image

Figure 2A:
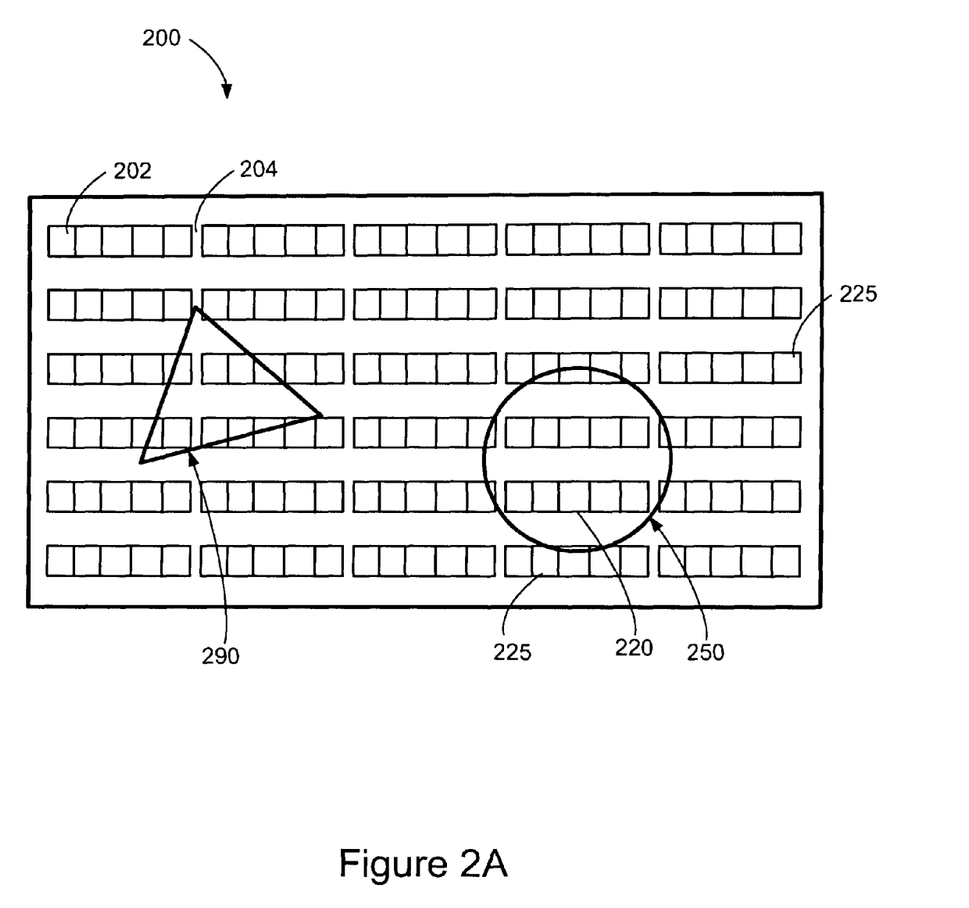
FIG. 2A is a schematic illustration of an image capturing two objects in accordance with some embodiments of the present invention.

FIG. 1 is a flowchart showing actions to be taken in a method (100) of defining a location of a given object in an image of interest, in accordance with an embodiment of the invention. The given object is characterized in having on its surface a specified pattern, and in at least one additional property. In an exemplary embodiment (illustrated in FIG. 2), the pattern is smoothness and the additional property is the contour of the given object. Some other illustrative patterns and additional properties are discussed below. FIG. 2A shows the vicinity of a candidate portion, with non-candidate portions not being shown, for making the illustration clearer.

FIG. 2A is a schematic illustration of an image 200, which illustrates the image of interest referred to in the method described in FIG. 1. Image 200 comprises pixels (for example, 221, 231, 232, and also 202, 204, and others), and captures two smooth objects (250 and 290) in a non-smooth background, which for simplicity is not shown in the figure. A smooth object (red ball) on a non-smooth background (room with a person holding the ball) is shown in FIG. 3. Although smoothness is used in the example illustrated in FIGS. 1 and 2, method 100 may be used, for locating objects having other specified patterns.

At 102, image portions (210) of a first group are specified. Optionally, in a first stage of the method, only portions that belong to this first group are searched for the pattern characterizing the given object. In the figure, some pixels, for example, 202 belong to the specified portions, and some, for example, 204, do not belong to the specified portions.

At 104, a first candidate image portion (220) is identified among the image portions of the first group. A candidate portion is optionally a portion that comprises the specified pattern or a part thereof. For example, if the pattern is smoothness, defined in that the difference in color between every two adjacent pixels is smaller than a given threshold, then a portion may be a candidate if the difference in color between every two adjacent pixels in the portion is smaller than the given threshold. In another example, the pattern is checkerboard-like, and a portion may be a candidate if it includes a sharp change from black to white. In some embodiments, several candidates are identified, optionally, several candidates are identified simultaneously.

At 106, an image region is defined. In the embodiment illustrated in FIG. 2, image region 250 is composed of image portions with the specified pattern surrounding the first candidate image portion (220) and surrounded by image portions 225 which are not characterized by the specified pattern. In embodiments where several candidates are identified, several regions are optionally defined.

Figure 2B:
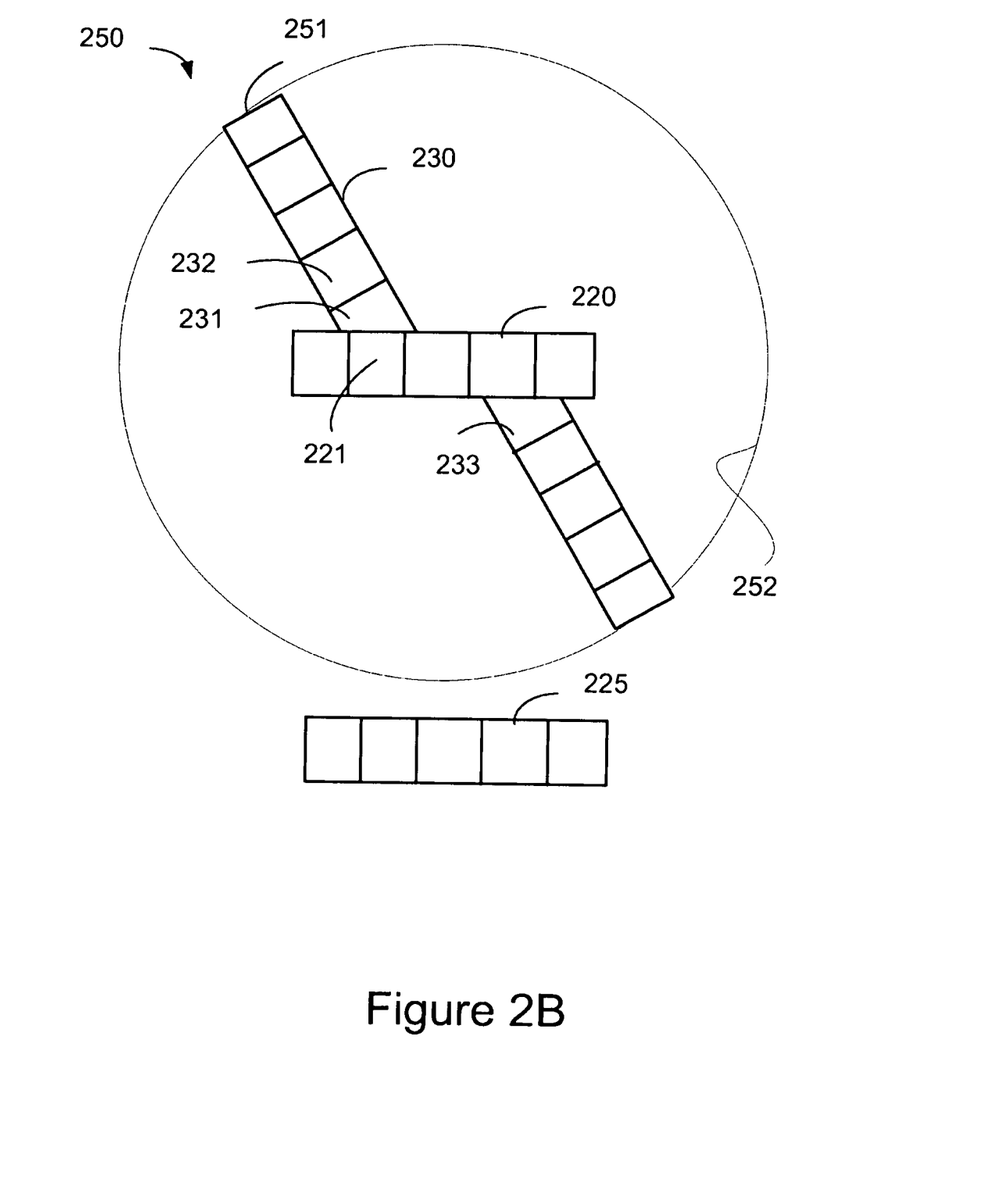
FIG. 2b is an excerpt from FIG. 2B showing at the vicinity of an identified candidate image portion in accordance with some embodiments of the present invention.

Optionally, image region 250 is defined by checking a second group of image portions (for example, 230, see FIG.

2B), all located in the vicinity of the first candidate (220), for the existence of the specified pattern.

In some embodiments, image portions of the second group are defined irrespective of the definition of portions of the first group. Accordingly, in some embodiments, some of the pixels belonging to image portions of the second group do not belong to any of the image portions of the first group. Alternatively or additionally, pixels in one image portion of the second group belong to various image portions of the second group. In some examples, image portions of the first group are positioned to form a grid, in which each two portions are either parallel to each other or perpendicular to each other, while portions of the second group cross portions of the first group in non-perpendicular angles.

In one example, the second group of image portions is made of portions (230, FIG. 2B) emerging in various directions from the first candidate (220). The image portions of the second group are checked for smoothness, and a border (252) is defined between a smooth region (250), and non-smooth portions surrounding it. The smooth region (250) includes the first candidate (220), and is being surrounded by non-smooth image portions. In such example, border 252, bordering between the smooth region and the surrounding non-smooth regions may be interpreted as a contour of an identified object. In some embodiments, however, an additional confirmation is required before deciding that the identified object is the given object that should be located. For example, the identified region should be characterized by a certain color property.

In some embodiments, the border is found using the following process. First, the difference in color between a first pixel (221) in the first candidate portion (220) and a second pixel (231), outside the candidate portion but adjacent to it is evaluated. In some embodiments, a similar evaluation of difference between other variables is determined. For example, difference in color, and/or difference in brightness. If the evaluated difference is greater than the specified threshold, the second pixel is part of a border between the smooth region and the non-smooth surrounding. If (as illustrated in FIG. 2) the difference is found to be below the specified threshold, another pixel (232), adjacent to the second pixel and lying along a line connecting the first and second pixels is checked. This process continues until a border point (251) is found. Then, the process is repeated with other pixels (for example, 233) adjacent to the first candidate and optionally lying along different lines. Eventually, a border (252) between a smooth region (250) comprising the first candidate and a non-smooth surrounding is defined.

At 108, it is checked if the identified region has the additional property of the given object. In some embodiments, several regions are checked. Optionally, the location of the given object is defined as the location of the defined image region only if the image region has the additional property of the given object. For example, in case the given object is a sphere, having a circular contour, and the identified region (250) has a circular contour (252), the location of the object is defined as the location of the identified region. If, however, the given object is a pyramid, having a triangular contour, and the identified region has a circular contour, the identified region is not identified as the object, and the process returns to 104, for finding a second candidate region (290). Optionally, the location of the given object is defined as the location of the image region that best fits to the additional property. For example, if the given object is a sphere, and several ellipsoidal regions were defined, the one with the axial ratio closest to 1 is determined as the given object, provided that this ratio is below some threshold, for example, 1.25.

Exemplary Image Portions

In some embodiments, each pixel in the image is included in one or more of the image portions of the first group. In other embodiments, some of the pixels are not included in any of the portions, and therefore, when a candidate is searched for, these pixels are ignored. In some embodiments, 75% or less of the image portions are included in image portions of the first group. Optionally, 50% or less, and in some embodiments 15% or less of the image pixels are included in image portions of the first group. Generally, when less pixels are in the first group, searching for the first candidate is more efficient, as long as the portions of the first group are spaced apart densely enough to ensure that part of the give object is captured in at least one of the portions of the first group.

The shape of each image portion is optionally of a rectangle having a length and a width.

The width is optionally of 1 pixel. The length is optionally between 10 and 20 pixels, for example, 16 pixels. Portions of other geometries and/or sizes are used in some of the embodiments. Optionally, the geometry and/or size of the image portions of the first group are determined in accordance with the nature of the pattern of the given object. For example, in some embodiments the pattern is checkerboard-like and the image portions of the first group are squares, for example, of 5 by 5 pixels each.

At least one dimension of an image portion of the first group is optionally smaller than a typical size of the object to be detected in an image. For example, when the image is circular, the length of an image portion is optionally smaller than the diameter of the circle.

Optionally, portions of different shapes, orientations, and/or sizes are defined for analyzing an image. For simplicity of the presentation, only image portions of equal dimension and shape, having two mutually perpendicular orientations are illustrated herein, but other arrangements are well within the reach of a person of ordinary skill.

Exemplary Patterns

In an exemplary embodiment, the pattern is smoothness. Optionally, every smooth image portion is carrying a portion of the pattern.

In some embodiments, the smoothness is characterized in that in each two adjacent pixels, the color differs in no more than a predefined threshold. For example $\Delta C/L < x$, where C stands for R, G, or B; $L=sqrt(R2+G2+B2)$; and x is the threshold, for example, 0.1.

Although RGB is used in examples provided herein, other color systems (for example, HSV (Hue Saturation Value) and/or CYM) are useful for determining the pattern.

In some embodiments, smoothness is determined in accordance with differences in light intensity, brightness, and/or other parameters. In other exemplary embodiments, other patterns characterize the object. Two possible patterns are depicted in FIG. 4A-4C.

Figure 4A:
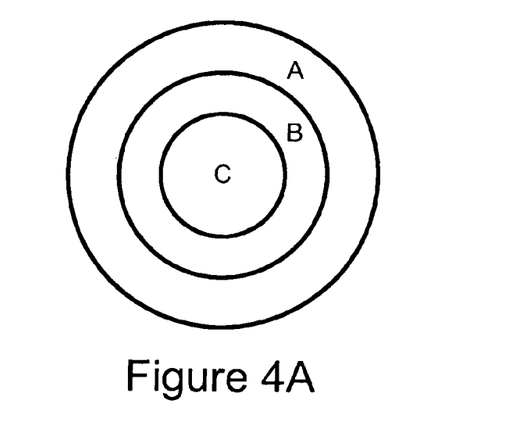
FIGS. 4A-4C are exemplary patterns in accordance with some embodiments of the present invention.
Figure 4B:
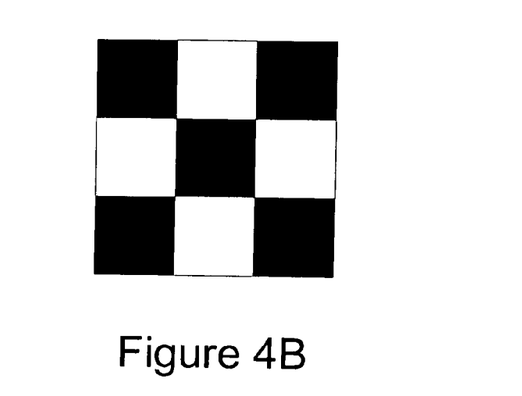

In one example, each of the portions A, B, and C forming the concentric pattern of FIG. 4A is of a different color, for example, red in the center (C), blue at the periphery (A), and green in between (B). In such an embodiment, there are several different portions of the pattern, and a candidate image portion can include any one of them. For example, portions having only red, only green or only blue pixels may be a candidate portions. Other possible candidate portions are portions having a sharp change from red to blue. Optionally, portions having a sharp change from red to green are not considered candidates. Optionally, portions having a sharp change from red to blue and then again to red are not candidate portions. More generally, there may be defined several different pattern portions, and a candidate image portion is one that has a pattern portion.

Figure 4C:
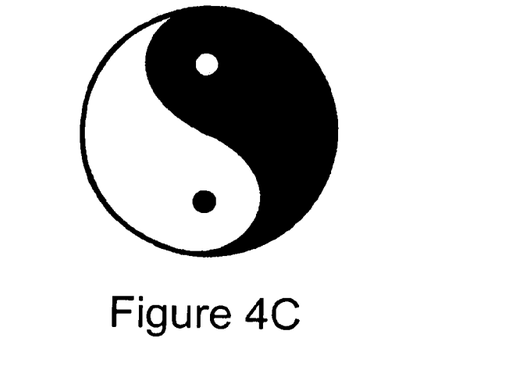

In one example, the checkerboard-like pattern illustrated in FIG. 4C is made of black and white squares. Optionally, different pattern portions are determined, for example, sections with alternating black and white pixels at some defined alternating patterns. For example, an entirely black section may be a candidate, while a section where each pixels is of sharply different color is not a candidate portion.

Exemplary Additional Properties

As mentioned above, in some embodiments, the additional property is the colour. For example, if the given object is a smooth red ball, smooth blue objects are not identified as the given object.

In some embodiments, the additional property is the contour. In the latter example, a smooth red non-spherical object is not identified as the given object.

In some embodiments, size is an additional property.

In some embodiments, aspect ratio is an additional property.

In some embodiments, the additional property is that candidate portions within the defined region make together the required pattern. For example, if different pattern portions are defined and searched for, after defining a region made of image portions, the additional property is that the various identified image portions make together the specified pattern. For example, when the pattern is of the kind illustrated in FIG. 4A, it is checked if the various red-blue-green portions in the identified area are arranged to make together the arrangement concentric rings with red in the center, blue at the periphery and green in between.

In some embodiments, two or more additional properties are used, for example, color and size.

Image Portions of the First Group

In some embodiments, image portions of the first group are sections, having one pixel width and length of between about 10 and 20 pixels, for example, 16 pixels. However, in some other embodiments, image portions of other geometries and/or sizes are defined in the first group of image portions.

For example, in some embodiments, longer or shorter sections may be defined.

In some embodiments, the image portions of the first kind are rectangles having width of 2, 3, 4, or any other number of pixels. In some embodiments, the image portions of the first group are squares. In some embodiments, the image portions of the first group are hexagons. In some embodiments, some image portions of the first group have one shape and others have other shape.

In some embodiments, the image portions of the first group are evenly distributed in the image. In some embodiments, the portions are more densely distributed in some parts of the image and less densely in other parts of the image. For example, in some embodiments the center of the image has more portions of the first group than the periphery of the image, concentrating more computational effort on finding the given object in the center of the image.

In some embodiments, the image portions of the first group are arranged such that each two portions are either parallel to each other or perpendicular to each other. Optionally, the image portions form together a Cartesian grid.

In some embodiments, the image portions of the first group are arranged to form a honeycomb.

In some embodiments, the image portions of the first group are at random locations and/or random orientations.

Image Portions of the Second Group

In some embodiments, image portions of the second group are sections, having one pixel width and length of between about 10 and 20 pixels, for example, 16 pixels. However, in some other embodiments, image portions of other geometries and/or sizes are defined in the second group of image portions. For example, in some embodiments, longer or shorter sections may be defined.

In some embodiments, the image portions of the second group are rectangles surrounding the candidate image, for example, adjacent to the candidate image. Optionally, an image portion of a second group is shaped as a rectangular circumference, surrounding the candidate image in a certain distance therefrom.

In some embodiments, one, two, or more of the image portions of the second group emerge from a pixel in the candidate image portion in an acute angle, for example, 30, 45, or 60 degrees from to the candidate portion. Optionally, various image portions of the second group emerge from different pixels in the candidate image.

Exemplary Starting Points for Searches of Candidate Portions

Optionally, a candidate portion is searched for. The search for a candidate portion optionally starts at a point where the chances of finding the given object are particularly high. For example, in some tracking embodiments, if the location of the given object a short while before the image of interest was taken is known, for example, from a preceding frame, the search for the candidate portion starts at this known location.

In some embodiments, the object has higher tendency to be in some places than in other places. For example, in some embodiments, the object is metallic, and it is known that are some magnets captured in the image, and the search begins near one of these magnets.

In some embodiments the object is searched for near the floor before it is searched for near the ceiling.

In some tracking embodiments, the object's trajectory is analyzed to find points where it is most probable to find the object if its tracks are lost.

Exemplary Tracking System

Figure 5:
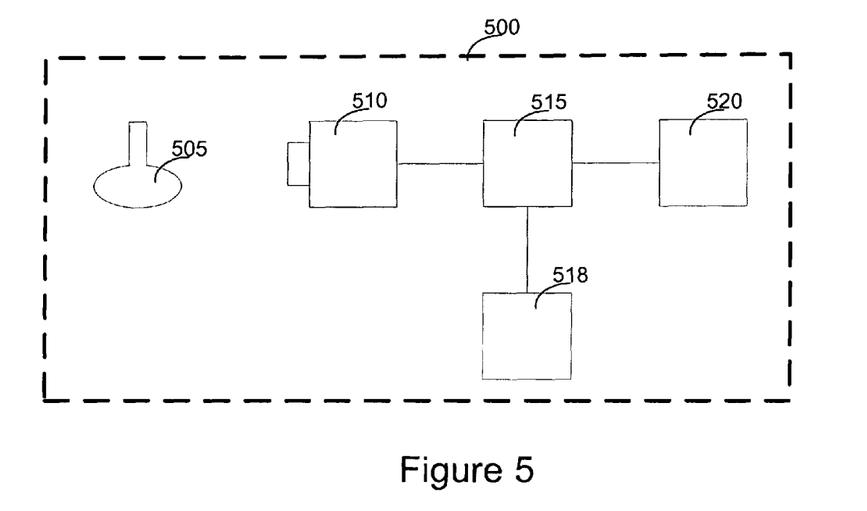
FIG. 5 is a simplified block diagram of a system for locating or tracking a given object in an image of interest, in accordance with some embodiments of the present invention.

FIG. 5 is a simplified block diagram of a system 500 according to an embodiment of the invention. System 500 is shown to include an object (505) to be identified, a camera 510 for capturing object 505, and a processor 515 for processing an image taken by camera 510 to locate object 505 in the image. Also shown in the figure is a storage area 518, which stores specified characteristics of object 505, including a specified pattern appearing on the object and one or more additional properties characterizing the object.

Camera 505 is optionally a video camera, capturing a video stream comprising, for example, about 25 frames per second. Optionally, processor 510 has an input for receiving from camera 505 images taken by the camera and a software modules (not shown in FIG. 5) configured to locate object 505 in an image before the next frame is fed into the processor. Optionally, processor 510 has an output for outputting the locations of the object in the captured frames to other processors or processing units (520) adapted to run a game considering the outputted locations.

Figure 6:
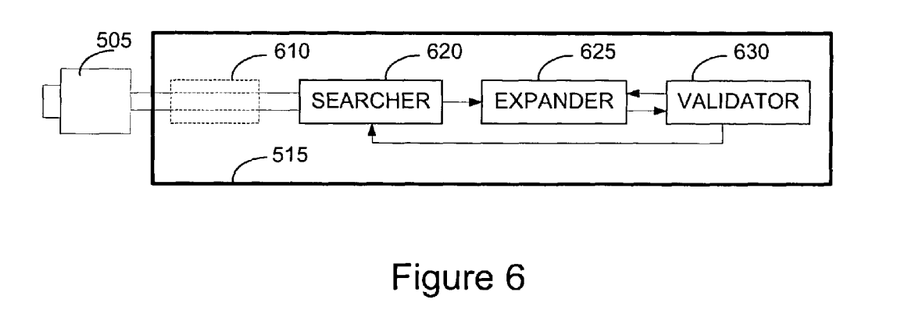
FIG. 6 is a simplified block diagram of a processor useful in the embodiment of FIG. 5.

FIG. 6 is a simplified block diagram of processor 510. The figure shows input 605 for receiving images from camera 505. Optionally, the received images are digital. Optionally, processor 510 has a digitizer 610 for digitizing non-digital images received from the camera.

The digital image goes into a candidate searching module 620. Candidate searching module is optionally a software module that checks predefined portions of the image for a specified pattern characterizing object 505.

Candidate searching module 620 outputs an identified candidate image portion to expander 625. Optionally, searching module 620 keeps searching for additional candidates parallel to the running of expander 625.

Expander 625 is optionally a software module, adopted to define image parts near the identified candidate portion, and check if these image parts carry a part of the specified pattern, which characterizes the given object. Expander 625 expands the area of the candidate identified by module 620 to a larger region, which comprises the candidate and is surrounded with image parts that do not carry a part of the specified pattern.

Expander 625 optionally outputs coordinates of pixels that belong to the identified image region to validating module 630. Optionally, after outputting the expanded region to validating module 630, expander 625 receives another candidate portion from searching module 620 and expands it while validating module 630 validates the outputted region is associated with object 505.

Validating module 630 optionally checks if the image region identified by expander for another property of the given object. In one embodiment, validating module 630 is adapted to identify if the contour of the identified area matches a specified contour of the given object. Optionally, validating module 630 considers more than one additional property before validating that the image region identified by module 625 is indeed associated with the given object.

In some embodiments, when validating module 630 validates that object 505 is located in the given image, it signals searching module 620 and expander 625 to stop running to free computational resources to other processing units of system 500, until a next image is fed into search module 620.

Although the method and system were described above by way of specific examples, they are not limited to these examples. For instance, the method and system are capable of locating and/or tracking two or more given objects in an image and/or in a video stream. In another instance, the given object may be of any shape or contour. While only round and triangular contours were described in detail, other contours, either of simple geometric shapes or any other shape may be used. More generally put, the invention is by no means limited to the examples provided herein, and covers any alternative or option apparent to a skilled person reading the present disclosure and using his general knowledge of the field and his common sense and creativity, and are limited only by the following claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of determining a location of a given object in an image of interest that comprises pixels, the object being characterized by having a smooth pattern and an additional property, the method comprising using at least one hardware processor for:

obtaining an image of the given object;

specifying a first group of image portions arranged to define a grid consisting of some of the pixels of the image that are arranged in non-contiguous lines, wherein at least one of said non-contiguous lines comprises a plurality of the pixels of the image;

identifying, among the specified first group of image portions, a candidate image portion that is characterized as comprising a portion of the smooth pattern, wherein the identification of the candidate image portion as comprising the portion of the smooth pattern is by searching the grid for adjacent pixels that differ in at least one of (i) brightness, (ii) color, and (iii) intensity, by less than 15%;

defining an image region around the candidate image portion, the image region being composed of image portions, each comprising a portion of the smooth pattern, the image region being surrounded by image portions not comprising a portion of the smooth pattern;

comparing the additional property of the given object with same property of the image region; and determining the location of the given object as the location of the defined image region, if the image region has the additional property of the given object.

2. The method according to claim 1, wherein the given object has a contour with a given shape, and the additional property is the shape of the contour.

3. The method according to claim 1, wherein the given object has a color and the additional property is the color of the given object.

4. The method according 1, wherein the given object has a second additional property, and the location of the given object in the image is defined as the location of the defined image region only if the defined image region has the second additional property of the given object.

5. The method according to claim 4, wherein the first additional property is the color of the given object, and the second additional property is the shape of the contour of the given object.

6. The method according to claim 1, wherein the image of interest is a frame in a video stream, wherein the location of the given object in a preceding frame in the video stream is known, and wherein the method comprises starting a search for the first candidate in the vicinity of the known location of the object in the preceding frame.

7. The method according to claim 1, wherein the image of interest is a frame in a video stream, and the location of the given object in a preceding frame in the video stream is unknown.

8. The method according to claim 1, further comprising using said at least one hardware processor for:

specifying a second group of image portions of said image, wherein said image portions consist of some of the pixels of the image and located in the vicinity of said candidate image portion, wherein the image region is being composed of image portions of said second group of image portions.

9. The method according to claim 8, wherein the second group of image portions consist of image portions that are not members of the first group of imager portions.

10. The method according to claim 8, wherein the second group of image portions consist of pixels not belonging to any of the image portions of the first group.

11. The method according to claim 8, wherein image portions of the second group of image portions cross image portions of the first group of image portions in non-perpendicular angles.

12. The method according to claim 8, wherein image portions of the second group of image portions emerge in various directions from the candidate image portion.

13. A system comprising:

an imaging device configured for capturing an image of an object characterized by a smooth pattern and at least one additional property;

a computer storage configured for storing the smooth pattern and the at least one additional property of the object; and at least one hardware processor configured to:
 (a) receive the smooth pattern and the additional property stored on the computer storage,
 (b) receive the image of the object taken by the imaging device, and
 (c) specify a first group of image portions arranged to define a grid consisting of some of the pixels of the image that are arranged in non-contiguous lines;
 (d) identify, among the specified first group of image portions, a candidate image portion that is characterized as comprising a portion of the pattern, wherein the identification of the candidate image portion as comprising the portion of the smooth pattern is by searching the grid for adjacent pixels that differ in at least one of (i) brightness, (ii) color, and (iii) intensity, by less than 15%;
 (e) define an image region around the candidate image portion, the image region being composed of image portions, each comprising a portion of the pattern, the image region being surrounded by image portions not comprising a portion of the pattern;
 (f) compare the additional property of the object with same property of the image region, and
 (g) determine the location of the object as the location of the defined image region, if the image region has the additional property of the object.

14. The system according to claim 13, wherein the at least one hardware processor is further configured to specify a second group of image portions of said image, wherein said image portions consist of some of the pixels of the image and located in the vicinity of said candidate image portion, and wherein the image region is being composed of image portions of said second group of image portions.

15. A computer program product for defining a location of a given object in an image of interest that comprises pixels, the object being characterized by having a smooth pattern and an additional property, the computer program product comprising a non-transitory computer-readable storage medium having program code embodied therewith, the program code executable by at least one hardware processor to:

obtain an image of the given object;

specify a first group of image portions arranged to define a grid consisting of some of the pixels of the image that are arranged in non-contiguous lines;

identify, among the specified first group of image portions, a candidate image portion that is characterized as comprising a portion of the smooth pattern, wherein the identification of the candidate image portion as comprising the portion of the smooth pattern is by searching the grid for adjacent pixels that differ in at least one of (i) brightness, (ii) color, and (iii) intensity, by less than 15%;

define an image region around the candidate image portion, the image region being composed of image portions, each comprising a portion of the smooth pattern, the image region being surrounded by image portions not comprising a portion of the smooth pattern;

compare the additional property of the given object with same property of the image region, and determine the location of the given object as the location of the defined image region, if the image region has the additional property of the given object.

16. The computer program product according to claim 15, wherein said program code is further executable by said at least one hardware processor to specify a second group of image portions of said image, wherein said image portions consist of some of the pixels of the image and located in the vicinity of said candidate image portion, and wherein the image region is being composed of image portions of said second group of image portions.

17. The system according to claim 13, wherein at least one of said non-contiguous lines comprises a plurality of pixels.

* * * * *